US007620936B2

(12) United States Patent
Ernst et al.

(10) Patent No.: US 7,620,936 B2
(45) Date of Patent: Nov. 17, 2009

(54) SCHEMA-ORIENTED CONTENT MANAGEMENT SYSTEM

(75) Inventors: Matthias Ernst, Hamburg (DE); Andreas Gawecki, Hamburg (DE); Axel Wienberg, Hamburg (DE); Frank Wienberg, Hamburg (DE); Olaf Kummer, Halstenbek (DE); Joachim Schmidt, Hamburg (DE)

(73) Assignee: Coremedia AG, Hamburg (DE)

( * ) Notice: Subject to any disclaimer, the term of this patent is extended or adjusted under 35 U.S.C. 154(b) by 650 days.

(21) Appl. No.: 11/233,727

(22) Filed: Sep. 22, 2005

(65) Prior Publication Data

US 2006/0031811 A1    Feb. 9, 2006

Related U.S. Application Data

(63) Continuation of application No. 10/265,825, filed on Oct. 7, 2002, now abandoned.

(51) Int. Cl.
G06F 9/44 (2006.01)
G06F 7/00 (2006.01)

(52) U.S. Cl. .................. 717/108; 717/170; 707/103 R
(58) Field of Classification Search ................ 717/108, 717/170; 707/103 R
See application file for complete search history.

(56) References Cited

U.S. PATENT DOCUMENTS

| 5,794,030 | A | * | 8/1998 | Morsi et al. ............. 707/103 R |
| 6,216,137 | B1 | * | 4/2001 | Nguyen et al. .......... 707/103 R |
| 6,460,052 | B1 | | 10/2002 | Thomas et al. |
| 6,701,514 | B1 | * | 3/2004 | Haswell et al. ............. 717/115 |
| 6,868,425 | B1 | * | 3/2005 | Bergstraesser et al. .. 707/103 R |
| 6,993,745 | B1 | * | 1/2006 | Ballantyne et al. .......... 717/108 |
| 2002/0161734 | A1 | | 10/2002 | Stauber et al. |
| 2003/0037039 | A1 | | 2/2003 | Mah et al. |
| 2003/0158871 | A1 | | 8/2003 | Fomenko |
| 2003/0204481 | A1 | | 10/2003 | Lau |
| 2004/0046789 | A1 | | 3/2004 | Inanoria |

(Continued)

FOREIGN PATENT DOCUMENTS

WO    WO 99/33006    7/1999

OTHER PUBLICATIONS

Wienberg et al., "Content Schema Evolution in the CoreMedia Content Application Platform CAP", In: Proceedings of the 8th intervational Conference of Extending Data Base Technology, vol. 2287, 2002.*

(Continued)

*Primary Examiner*—Wei Y Zhen
*Assistant Examiner*—Ryan D Coyer
(74) *Attorney, Agent, or Firm*—Kenyon & Kenyon LLP

(57) ABSTRACT

A schema-oriented content management system, in particular to an apparatus and a method for storing and accessing data in a content management system which allows content schema evolution while maintaining operation based on already stored content data. A data processing apparatus for storing and accessing data in a content management system comprises a content object generation arrangement for generating content objects to store content data, wherein a content object comprises a plurality of property-value bindings, a content object storing arrangement for storing generated content objects, a content schema generation arrangement for generating an object-oriented content schema to model content data, a content schema storing arrangement for storing the generated content schema, and a content object accessing arrangement to access stored content objects by way of the stored content schema.

34 Claims, 15 Drawing Sheets

U.S. PATENT DOCUMENTS

2004/0162841 A1    8/2004    Bernstein et al.
2005/0034107 A1    2/2005    Kendall et al.

OTHER PUBLICATIONS

"A White Paper: TOPLink for Java" 2000, The Object People, Canada.*

Wienberg, A. et al., *Content Schema Evolution in the CoreMedia®—Content Application Platform CAP*, Mar. 14, 2002, Springer-Verlag Heidelberg 2002, 11 pgs.

* cited by examiner

A)
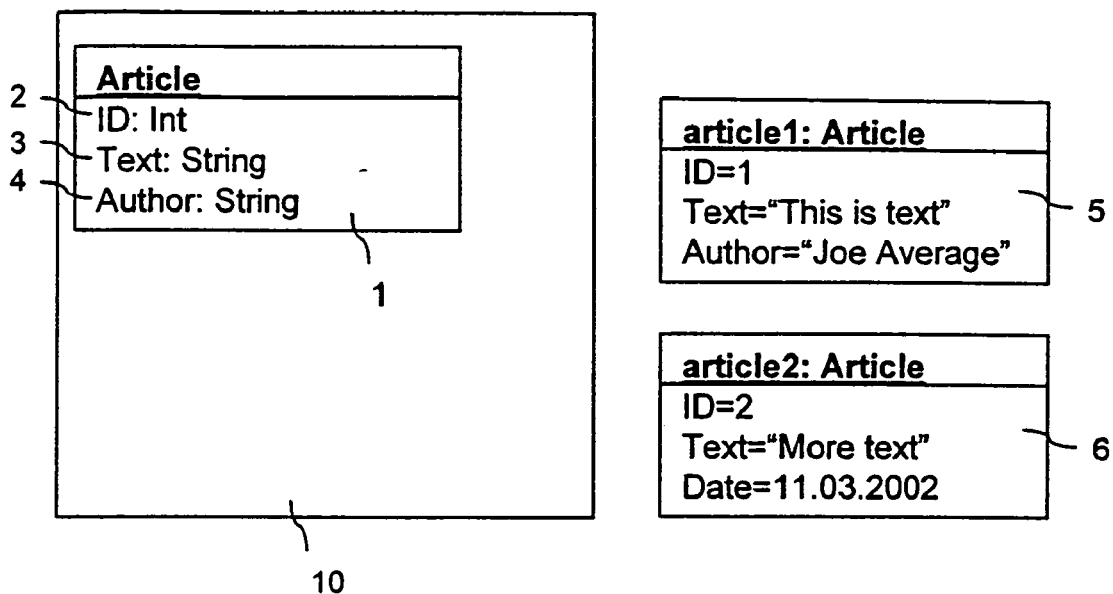
B)
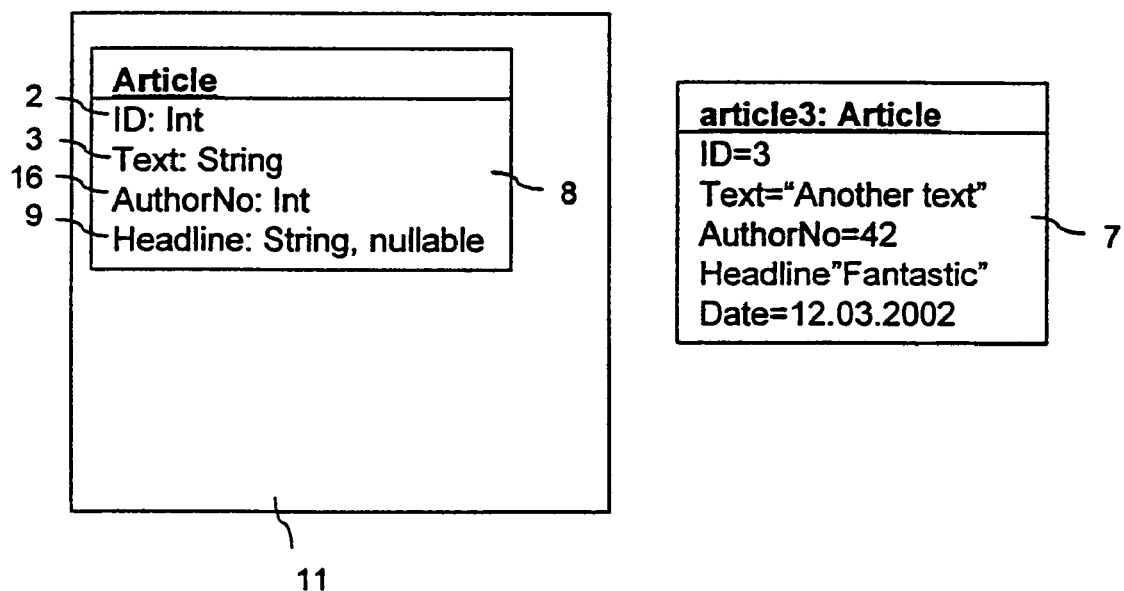
Fig. 3

A)
"Today's Top 3 Articles"

```
Article[1].Text "by" Article[1].Author
Article[2].Text "by" Article[2].Author
Article[3].Text "by" Article[3].Author
```

B)
Today's Top 3 Articles

| This is text | by | Joe Average |
|---|---|---|
| More text | by | Jim |
|  | by |  |

C)
Today's Top 3 Articles

| This is text | by | Joe Average |
|---|---|---|
| More text | by | Jim |
| Another text | by |  |

"Yesterday's Top 3 Articles"

```
Article[1].Text "by" toName(Article[1].AuthorNo)
Article[2].Text "by" toName(Article[2].AuthorNo)
Article[3].Text "by" toName(Article[3].AuthorNo)
```

B)

Yesterday's Top 3 Articles

| This is text | by | Unknown |
| More text | by | Unknown |
| Fantastic | by | Frank Wright |

C)

Yesterday's Top 3 Articles

| This is text | by | Joe Average |
| More text | by | Jim |
| Fantastic | by | Frank Wright |

Fig. 5

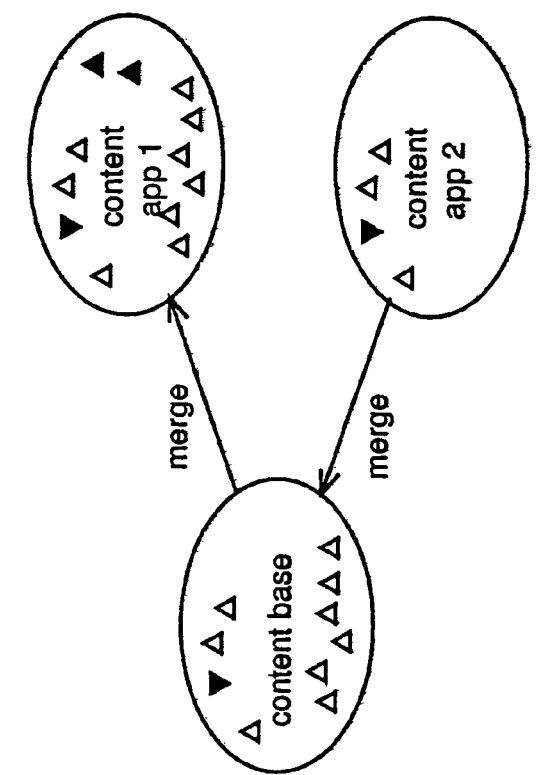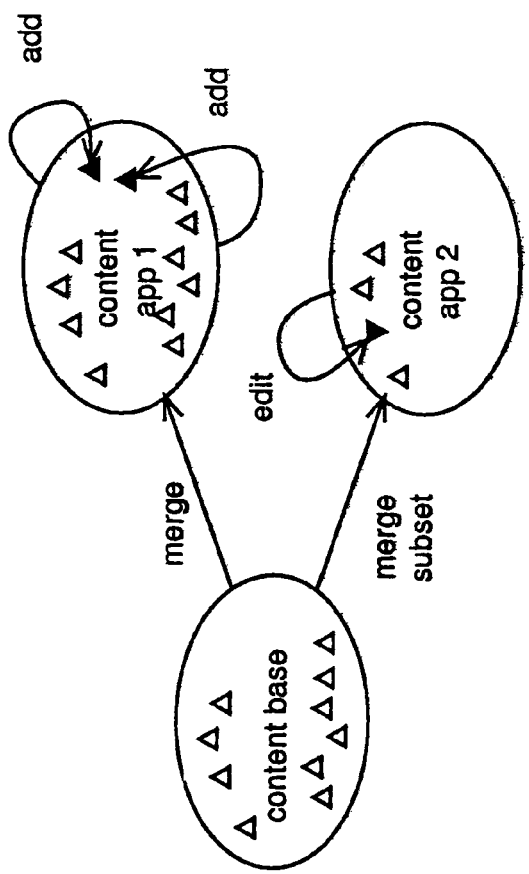
Fig. 7

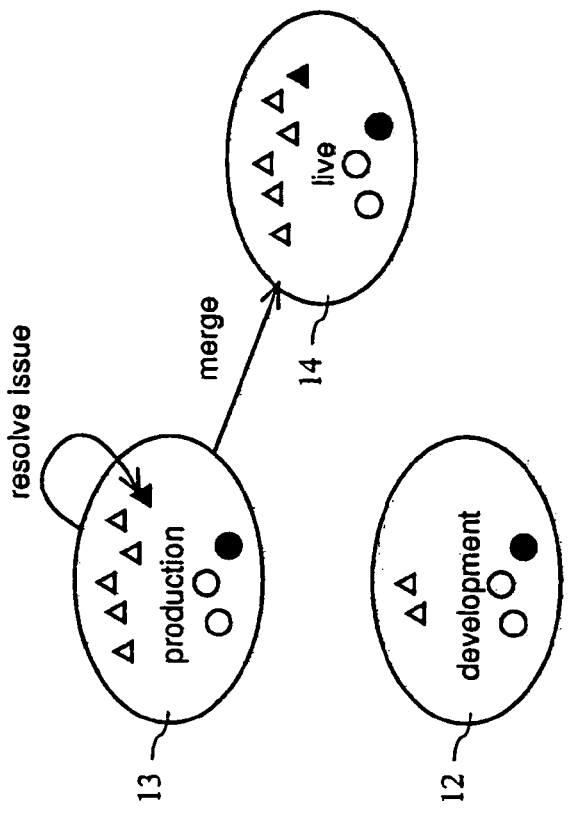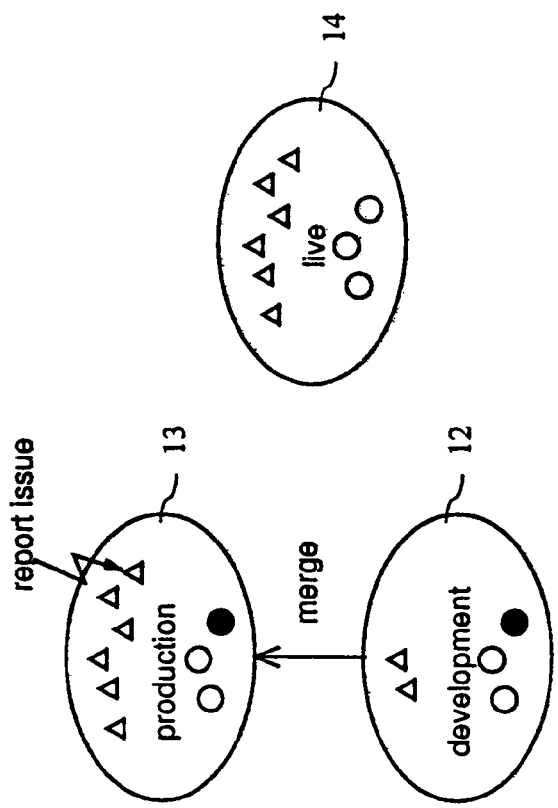
Fig. 8

A)

B)

| property | property name |
|---|---|
| 10 | name |
| 11 | articles |
| 12 | text |
| 13 | imglink |
| 14 | data |

C)

| object ID | property ID | string value |
|---|---|---|
| 1001 | 10 | Welcome! |
| 1002 | 12 | sports article |
| 1004 | 12 | politics article |

D)

| object ID | property ID | link target ID |
|---|---|---|
| 1001 | 11 | 1002 |
| 1001 | 11 | 1004 |

US 7,620,936 B2

SCHEMA-ORIENTED CONTENT MANAGEMENT SYSTEM

CROSS-REFERENCE TO RELATED APPLICATIONS

This application is a continuation of U.S. patent application Ser. No. 10/265,825, filed on Oct. 7, 2002 now abandoned; and claims priority to European Application Serial No. 02 006 585.0, filed on Mar. 21, 2002.

FIELD OF THE INVENTION

The present invention relates to a schema-oriented content management system, in particular to an apparatus and a method for storing and accessing data in a content management system.

BACKGROUND INFORMATION

The pervasive use of internet technologies for the access of all sorts of data sources and the increasing size and complexity of internet systems constitute major challenges for the providers of information technology infrastructure. The information to be exchanged must be produced, validated, stored, retrieved, analysed, formatted, and delivered while observing high availability and performance requirements.

As the volume of data increase, it becomes insufficient to provide automated support only for the delivery of information to the user, which is often done via standard protocols like HTTP utilising standard software, such as web servers and web browsers. The data creation process must be supported in its entirety. E.g., for an online magazine it is necessary that the content of the magazine, which might consist of text documents, pictures, sound tracks, or video streams, is properly gathered and administered. Web content management systems (WCMSs) address the desire to produce larger and more complex web sites more quickly and with higher quality.

Large web sites are often developed collaboratively by several people whose access has to be coordinated and controlled. WCMSs usually do this by offering exclusive locks on individual documents and by verifying proper authorization. Furthermore, it is necessary to separate content and layout of the web site, since different people have specialised roles and responsibilities with respect to the web site development or operation, e.g., text editor, designer, programmer, and administrator. A WCMS therefore tries to structure the information so that different roles can work as independently as possible, e.g., allowing a text editor to focus on producing text without bothering with layout. The content is not just meant for access by human users but is also the data on which import, export, and personalization services operate.

The actual web site is often generated from a content database using templates which select and combine the content. For example, navigation bars are computed from the current position in the navigation hierarchy, a centre pane receives text articles, and a side bar features related content.

Because material published on a web site immediately goes public, quality assurance is important. To exploit the web's potential for up-to-date information, publication should be as fast as possible. On the other hand, published material should adhere to certain quality standards, at minimum contain no spelling mistakes, dangling links, or broken HTML.

In a content management system an explicit content schema may be used to model the content data to be handled by the WCMS. However, a content schema is almost impossible to get right on the first attempt during the development of the web site. Furthermore, the schema is not totally fixed over time: Organisational or technical considerations can suggest improvements and extensions to the content schema. Therefore, changing application requirements make it necessary to change, the schema even when the web site is already in production and content data has been accumulated.

Because the content data itself is a valuable asset, it is very expensive to throw away existing data and to start the data collection from scratch after modifying the content schema. In response to a schema migration, portions of the data already accumulated may be automatically converted to the new schema but sometimes human interaction is required to adapt content data to the new schema. This process is slow, so that inconsistent intermediate states will need to be managed persistently by the system. During these inconsistent periods some of the automated parts of the WCMS will not be fully functional due to the mismatch between schema and data. This may interrupt the entire web publishing process and halt the web site delivery operation.

Data migration strategies which, after a schema modification, convert the entire existing data to the new content schema are no solution to the evolving schema development process which is typical for large web site development. Many people are involved in this development process, and it is often that modifications to the schema are applied that may cause conflicts on the content data. Furthermore, it is likely that some changes to the content schema or the content data are undone later on in the process, which is only possible when the data is kept in its original form as long as possible. Data migration operations may cause irreparable data loss and, therefore, may prevent the restoration of the original content data, when applied automatically on the entire data. In addition, converting the entire content data of large web sites to a new schema is very expensive and requires a lot of computational effort. This becomes even more important when the site development or operation is an evolution like process requiring frequent releases of content schema and data.

Furthermore, inconsistencies within the content schema or between content and schema might arise out of schema evolution operations. These inconsistencies need to be detected efficiently and reliable, in order to maintain the availability and quality requirements for online publishing.

SUMMARY OF THE INVENTION

It is an object of the present invention to provide a method and an apparatus for handling content data in an content management system, which allows content schema evolution while maintaining operation based on already stored content data.

A method and an apparatus for storing and accessing data in a content management system is provided. Content data is generated and stored in content objects comprising a plurality of property value bindings. A content object can bind properties to values. In general, a content object can use all properties to store content data. Preferably, some predetermined properties are used to store certain types of content data in content objects. The values are stored according to the property type corresponding to the respective property. Each property has a declared property type defining the type of information that may be stored in the corresponding value. Available classes of properties may include atomic properties such as string and integer properties, media properties or link properties.

An object aggregates property bindings, each binding a property to an appropriate value. Each object may have a declared type. An object type declares properties and can inherit further properties from a parent type.

Storing content data in content objects comprising property value bindings is a very flexible way of organizing a content database. Content data, e.g., an article, a picture, a headline, or an index page may be represented as distinct objects that are associated in various ways. Automated procedures may be applied to the content data, which would be very difficult when storing unstructured data.

An object oriented content schema for modeling content data by defining content object types is generated and stored. The content object j types declare required object properties. The schema may be an aggregation of meta objects, namely types and property declarations, interconnected by inheritance and associations. The schema may be a mutable schema which is modified to adapt to changing requirements. The meta objects themselves are again modeled according to an immutable meta schema.

A content object is (read and/or write) accessed by means of the content schema. Accessing contents by means of the content schema allows some well defined access procedures for reading/writing the content data to be called when the data is used, e.g., in an application. Since the data is stored in content objects based on properties, the content schema used for accessing the data objects can interpret and validate the stored data based on the content object types. E.g., it is possible to fill in values for absent property values of content objects. Default values may be derived from an object or property specific recovery procedure. This allows the content management system to operate on an "imperfect" database having missing data and/or data type mismatches. In addition, it is possible to save storage space in the database when storing nullable properties. Since these properties are not stored when not present, i.e. when no value is available to be bound to the property, the database size is reduced. A default value for the respective property may be used when the content object is accessed. In contrary to many database systems, no memory locations for nulled properties are allocated and no "null" values are stored.

Furthermore, a content object may be presented to a user or an application by accessing (reading) each property of the content object according to the respective property declaration or the object type definition for the content object. E.g., the properties of a content object may be formatted in different ways depending on the property or the property type. This allows predetermined data transformation to be applied on content data when it is used. Accessing the content objects by means of the content schema allows many automated procedures to be applied to the content data.

On the other hand, since content data is generated and stored independently of the content schema, the proposed method and apparatus for storing and accessing data is much more flexible than known object oriented databases. In an object oriented database the content objects must strictly conform to the object type definitions of the schema. In object oriented databases content objects are always generated and stored according to the content schema. Upon a content schema modification the entire database is usually converted to match the modified schema. On the contrary, in the present invention, content objects may be generated according to the available content data. This is particularly important, if content data is imported from content sources and the available data does not match the content schema. In the present invention, the imported data may be stored in content objects comprising the respective properties of the imported data and not the desired properties declared in the schema. This gives much flexibility in storing the data, e.g., imported from different sources, but still maintains a structured database.

It is preferable to examine the integrity of the stored content objects by verifying if the stored content objects match the content schema. Content objects may mismatch the content schema, because objects are stored independently of a content schema and may comprise properties from those declared in the object types. Content objects may also mismatch the content schema after a modification of the content schema which happens frequently during web site development.

Typical operations to modify the content schema during schema evolution are: add property; remove property; move property to supertype; move property to subtype; rename property; reorder properties; add subtype; extract common supertype; duplicate type; rename type; and change property type. These operations may be applied to the content schema to adapt the present content schema to changing requirements and are supported by the content management system of the present invention without losing its access functionality to content data already stored. Since in the present invention the content objects are stored independently of the content schema, access to the accumulated content objects is always maintained, even if the stored content and the content schema deviate, and even if the content schema itself is inconsistent. E.g., when a property in the content schema is moved to a subtype, access to the respective property in content objects is still possible as long as the relation between the moved property in the content schema and the stored value bound to the property in the content object is maintained.

A property may be a link property linking a content object having the link property to a target object. Link properties are in particular useful to express relationships between objects. A property may be a link collection property comprising a set or bag of links to target objects. This is in particular useful if a link collection is indexed using a given key property to represent a branching relation wherein the actual branch to be followed is determined by the key. It is preferable that the integrity of content objects is examined by comparing the types and property value bindings of stored objects to the object type definitions of the content schema. By comparing the property value bindings of stored objects to the required object properties according to the content schema type mismatches may be detected.

The content schema may impose additional constraints on the content objects. A constraint may be the declaration of permitted properties. Based on this constraint only properties declared in the object type definition may be stored with a content object. Another constraint may relate to required properties: properties declared as nonnullable in an object type must be nonnull and, therefore, stored in a respective object. An example for a required property requires that each article must have a title and a text. Furthermore, range constraints declaring minimum and maximum values for a property value may apply. Cardinality constraints may require that the number of elements of a link collection property must not be outside the declared minimum and maximum cardinality. For example, a home page must link at least three and at most ten articles. Target type constraints may declare the target type of elements linked to by a link collection property. In addition to property type mismatches, stored content objects may violate constraints imposed by the content schema. The integrity of the stored content objects may be examined by verifying the constraints imposed on the stored objects.

Upon a detection of an integrity issue a mismatch report may be generated. The mismatch report may list all mismatching content objects, their mismatching properties and/or the type of mismatch. The mismatch report may be used to protocol the effects appearing after schema modifications. Furthermore, data mismatching the content schema may be presented to a user who is prompted to adapt the data. The user may correct mismatching property types or fill in missing values for nonnullable properties. This manual correction process may be supported by a suitable user interface presenting error messages, invalid property values and some explanation about the reason for the integrity issue to the user.

While the integrity issues described above are acceptable and allow the core system to function, for many embodiments of the present invention it is preferable to resolve as many integrity issues as possible automatically within a short time. Only the remaining integrity issues persistently affect the access of content data.

Therefore, upon a detection of an integrity issue a predetermined issue resolution procedure may be employed to resolve the mismatch by adapting the content data, especially by adapting property values. This resolution procedure may apply one or more of the following rules, depending on the necessity of issue resolution and the necessity of keeping old data.

Rules to apply when a property binding violates constraints from the property declaration: change property value to a default value, possibly to a null value; compute new property value based on old value; if an integer value outside of the declared minimum and/or maximum value of a range constraint is detected, clip it to meet the constraint; if an link list is too long, truncate the link list.

Rules to apply when a property is illegally present and there is another nulled property of similar name: move the value of the illegally present property to the other property, move the value of the illegally present property to another property after type correction, e.g., link→link list, integer→float, string→date.

Rules to apply when a property is illegally present: look for a subtype of the current type declaring the property and replace the current type by the subtype; remove the property.

Rules to apply when a property is illegally nulled: look for an undefined, but existing property of similar type and name, then move the value for that property to the nulled property; initialise the property with a default value; compute property from other property using some application level procedure; in the case of a link property, create a resource of the required type, binding properties to values with a suitable heuristic. The latest issue resolution procedure may, e.g., when a property is illegally present in the original resource and that property is declared in the link target type, move the property to the newly created resource.

In response to a content schema modification the integrity of stored objects may be examined only for those objects that may be affected by the schema modification. It is preferable to examine the integrity of objects of a modified object type or a subtype of a modified object type. It is also preferable to examine the integrity for objects comprising a modified property and/or for objects affected by modifications of constraints relating to attributes of properties. Based on the object-oriented type hierarchy declared in the content schema it is possible to determine the effects of schema modifications on content objects. Therefore, only a partial examination of the content objects is required to verify the integrity of stored objects. Schema modifications may be verified without excessive integrity checking. This partial object verification saves computational effort in maintaining consistency in the entire database. This is in particular important for large content databases, since it is not necessary to examine the entire database upon a modification of an object-type definition or a property-type definition.

Based on the object-oriented approach for storing and accessing data the following rules may be used in order to determine the content objects that may be affected by a schema modification.

Rules relates to permitted properties: when a property is changed in a certain object, check the object; when a property declaration is added or removed from an object-type, check all instances of the type and all subtypes.

Rules relating to required properties, range constraints, cardinality constraints or target type constraints: when a property is changed in a certain object, check the object; when a property declaration is added, removed or changed, check. all instances of all subtypes of the type that defines the property; when a property is moved from one type to another, only check the instances of each type that is an instance of a subtype of exactly one (not both) of source and destination type.

Rules relating to index properties:

when a key property of an object is changed, recheck all indexes that include the object; when an object is added to or removed from an indexed link collection, recheck the index.

Rules relating to modifications of the type hierarchy:

when the type hierarchy is changed (i.e. when a supertype link is changed) and the new supertype inherits a set of properties different from the original one, then all instances of the moved type and its current subtypes must be rechecked.

In order to automate updates of property values it is preferable that a property is a computed property. The value of the computed property is automatically calculated upon access on a content object whose type declares the computed property. Because computed properties are updated automatically, computed properties satisfy global integrity constraints more easily, reducing the need for integrity checking. Furthermore, computed properties reduce the required storage size.

The value of a computed property of an object may be calculated based on a set of properties of that object, e.g., a computed property may be the mean value of a specified set of property values. The value of a computed property may also be a collection of objects having link properties which are linking back to a content object having the computed property. This "reverse link collection" is a set or bag of objects that link to the object. Further computed properties may be indices on a link collection property. The resource stores the property LINKS and every linked resource has a property NAME. A lookup table may be generated to automatically locate a resource in LINKS with a given NAME. When a property holds a link to a binary object (e.g. picture, movie, Word document) a computed property may be deployed whose value depends on the binary property, e.g., the height of the stored picture, the playtime of the movie, the number of pages of the Word document. It is also possible to calculate a computed property based on a predetermined algorithm that derives the property value given the object and the state of the remaining workspace. For computed properties, care is to be taken to cache computed properties as long as possible, but to recompute the values automatically when needed.

Computed properties are especially useful for directories/folders. When the content of a folder is stored using an ordinary link collection that references the contained document, every document that is added or removed in the directory requires a change to the folder object. When documents link to folders so that folders can keep track of their contained document using a computed property, the folder objects are changed only rarely. This removes a possible performance bottleneck. Computed properties may also take the place of obsolete properties after a schema migration, so that read access still works as before. For this reason, computed properties should be treated like stored properties whenever possible.

Resource versions for modifications of content objects or object-type definitions may be recorded. A resource version stores a version of a resource, i.e., either a content object or an object-type definition, in order to record the evolution process of the resource and reproduce old versions. It is preferable to treat content objects and object-type definitions uniformly as resources for the purpose of versioning. Since the content schema is an aggregation of object-type definitions and property type definitions, the content schema may be versioned in the same way as content objects.

Resource versions may be stored upon modifications of content objects or object-type definitions, at certain points of time, upon receiving a user command, or upon receiving a versioning request by some system component. It may not be necessary to store every modification of resources. It is preferable to record some selected state of the resource, possibly based on a mandatory check-out/check-in procedure. E.g., a developer may check out an object-type definition of the content schema, thereby acquiring exclusive access to the resource, apply a set of modifications to the object type and check in a modified object type definition. Upon the check-in of the modified object-type definition, a new version for this resource may be stored.

A label referring to a set of objects each having a specified version may be stored in order to refer to this set of objects. Also a label referring to a content schema version comprising an aggregation of object-type definitions each having a specified version may be stored. By means of this label a version of the entire content schema is generated. Preferably a label is used to record a set of versions that fulfil some interobject integrity constraints.

In order to prevent a proliferation of versions in the referring or aggregating object, versions of content objects comprising link properties or link collection properties are stored irrespective of the versions of target objects. Otherwise, when a version is directly linked from many sources, a modified version would only be linked after changing all referring resources, thereby generating new version of these resources.

The content schema and the content objects may be stored in workspaces. A workspace may be formed based on labels. The labels select the set of objects comprising the workspace. Modifications of resources remain local to the respective workspace in which the modification occurred until explicitly transferred to another workspace. A workspace is the virtual content management system in which a user works, i.e., his view on the content management system. Changes applied in other workspaces have no effects on the present workspace until the changes are integrated in a controlled way. This allows parallel development and/or content data authoring to happen in each workspace individually.

In content management systems it is preferable that a development workspace for the modification of the content schema, a production workspace for the generation and modification of content objects and an integration workspace for the integration of the content schema modification, the content object generation, and the content object modification are provided. In this setup the roles of different people in web site development and operation are reflected. Developers modifying the content schema operate in the development workspace. Modifications of the content schema do not influence the work of authors operating in a production workspace. In the production workspace, content objects are generated and modified in order to accumulate and update content data. Upon reaching a consistent content schema and verifying the effects of schema modifications on content data, resources from the development workspace and the production workspace are integrated in an integration workspace. During this integration some integrity issues may be detected, and the content schema and/or content objects may be adapted. It is preferable to transfer the resources of the integration workspace after the issue resolution to an additional live workspace. In order to prevent any impediment caused by the integration on the actual web site operation, the actual web page generation for the public user of the web site may operate based on the live workspace.

Different versions of the same resource (object or object type) from a source and a target workspace may be unified in the target workspace. Unification may be performed by selecting the latest version for the resource of one workspace, if the latest version of the other workspace is preceding the selected version. Otherwise, a version conflict is detected and the versions from both workspaces are marked as conflicting versions. Conflicting versions for the same resource may be merged into a single version. Merging may be performed individually for every property used in any of the versions, taking into account the property values of a suitably determined common predecessor version of all conflicting versions and the property values of the conflicting versions.

Unification means the integration of possibly branched version histories from different workspaces into a single workspace. Merging means the integration of possibly different versions into a single version that combines all changes. It is preferable to treat every resource (i.e. every version history) separately.

The integration of different versions may preferably operate as follows: Unless already present, all versions of the resource required for merging are copied from the source to the target workspace. If the current version (head version) of the resource in the source workspace precedes the current version of the resource in the target workspace, the current version of the target workspace is selected and no merging is required. If the current version of the resource in the target workspace precedes the current version of the resource in the source workspace, the version from the source workspace becomes the new current version in the target workspace and no merging is required. Otherwise, the versions are unordered and merging is required.

For a merge of a resource a common predecessor of the versions to be merged is determined. For merging it is suitable to treat all properties separately. If a property has changed in one version, but not in the other, the changed property may be used as merged property. It may be reasonable to report a warning about a heuristic merge. If the property has changed in both versions, a property-type specific merge algorithm may be enacted. The merge procedure may be dynamically configurable.

Content objects, content types and/or properties may be identified by unique invariable identifiers. Content objects and/or content types may be represented in a persistent store. The representation of content objects and/or content types may be based on the unique invariable identifiers.

The persistent store may be updated in isolated transactions. This way, changes from different sources can be applied to the objects without interfering with each other. Transactional access is desirable when unifying many resources in a workspace at once or when making joint updates of the schema and configuration objects.

The persistent store may be a relational database or an object database. A mapping of the content objects and/or the content schema to a relational database may be provided based on the identifiers. The relational database may be used to store the content data in content objects independently of the content schema. Access to the stored information in the database is maintained, even if the stored content objects and the content schema deviate. The mapping of the objects to the database may be performed by a set of tables, where each table stores property-value bindings for one property type, i.e. integer properties, string properties, and so on. Other database mappings are possible, e.g., one table may be used per property, or one table may be shared by different property types.

It is preferable to distribute event notifications upon changes to the content objects or the schema. Based on received events other parts of the content management system, e.g., the web site generator, may take actions. Events may be stored persistently so that the history of events may be retrieved. A persistent storage is important for those content applications that must analyse the entire stream of changes to the repository, e.g., to maintain a searchable index or to collect statistical data. The persistent storage will allow such applications to resume work after a system malfunction.

The method according to the present invention is preferably executed by an electronic computer system comprising suitable hard and software. The inventive apparatus is preferably embodied as an electronic computer system comprising suitable hard and software.

The apparatus according to the present invention may preferably comprise an input means for inputting content data to be stored. Data may be inputted from an manual input terminal for data acquisition and/or by inputting data from other systems, in particular databases or online data distributors. Inputted data may be converted or transformed in order to match the format of the content management system. The apparatus may comprise an output means to output content data, e.g. an output terminal to display the data for processing. Outputted content data may also be processed by further data processing systems, such as web page generators or web servers. A web page generator may request content data from the content management system in order to generate web pages to be displayed.

The presented method and apparatus for storing and accessing data in a content management system stores content data in content objects, i.e., in a structured way. This allows automated procedures to be applied to the content data, which would be very difficult when storing unstructured data. Since the content objects are generated independently of the content schema, a flexible object-oriented content database is provided enabling content schema evolution based on the changing requirements for a web site. The content schema in the present invention may be modified resulting in deviations between content schema and stored content objects.

The presented method for operating a content management system allows access to the stored content data even if the content schema and the content objects mismatch. The operation of the web site is always maintained and data to be presented may be retrieved from the database. The operation of the database is independent of a schema mismatch and inconsistent objects may be accessed and corrected.

The proposed method and apparatus allow efficient data import based on the data format of the imported data. Since no data conversion is required, the computational effort for converting an entire database is avoided. Furthermore, it is not necessary to store different versions of content objects caused by converting content objects to a new data format directed by a modified content schema. This saves significant amounts of storage spaced required to store different versions of the entire database in various formats and allows large web sites to the developed without excessive storage requirements. The access, the presentation and the modification of the content data is governed by an explicitly stored meta schema.

According to the present invention, inconsistencies between content and schema that might arise out of schema evolution operations may be detected. Based on the object-oriented structure of the database this issue detection may be performed without examining the entire database, i.e., all content objects, which reduces the computational load on the content management system caused by frequent schema modifications. Furthermore, several issue correction procedures are provided to automatically adapt the content data to the modified schema.

In the present invention, workflow support and multiuser access in web site development and operation are provided by using workspaces that isolate users or groups of users from each other while enabling controlled information exchange. By means of automated unify and merge procedures different versions of possibly nonlinear branching version histories of resources are integrated. Since object-type definitions and content objects are treated in the same way, a unified approach to handle content schema evolution and content generation is provided.

BRIEF DESCRIPTION OF THE DRAWINGS

FIG. 3 is a first illustration of an example to explain the handling of content data according to the present invention.

FIG. 4 is a second illustration of an example to explain the handling of content data according to the present invention.

FIG. 5 is a third illustration of an example to explain the handling of content data according to the present invention.

FIG. 7 shows another example to explain the evolution of shared content.

FIG. 8 shows an example to explain the correction of content.

DETAILED DESCRIPTION

In the CoreMedia Content Application Platform (CAP) an object-oriented schema is used to model content data. The schema is explicitly defined, stored in and understood by the content management system. Content objects are classified by their structure, and their properties and associations are defined. In order to allow a content schema evolution, the schema needs to be a variable, with a concrete schema developed and adapted on a per project basis. The schema and structure for a web site is usually created by starting from a "best practice" sample solution and modifying it until it fits the site's requirements. Based on a flexible schema it is possible to provide an application platform, providing the basic services and frameworks upon which various applications can be built.

Figure 1:
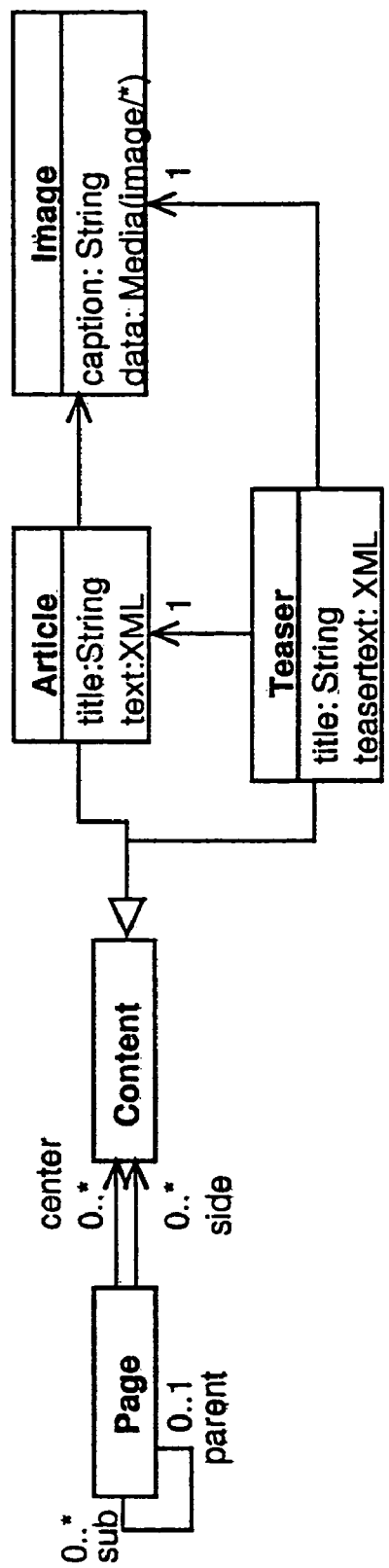
FIG. 1 shows a simple content schema for content modelling, represented as UM.

Deploying an explicit schema in content management provides a communication vocabulary for all the people involved in developing and maintaining the web site. It eases the understanding and the handling of instances of the schema. When used to express assumptions made by algorithms it improves correctness and efficiency of automated services by offering formalised consistency guarantees. FIG. 1 shows a simple content schema for content modelling, represented as UML.

However, due to initial lack of understandings and to changing requirements, the explicit content schema needs to be changed during operation of the web site without unduly disrupting operations. Since collecting and processing content data is very expensive, content schema evolution must be possible, even if a considerable amount of content has already been accumulated.

In the present invention an object-oriented schema is deployed. This allows automated procedures to be applied to the content data, which would be very difficult when storing unstructured data. A meta-model is used for expressing the schema and for expressing the content. The model is object-oriented, implementing a subset of UML. Objects are the semantic unit for reference, locking and versioning.

Figure 2:
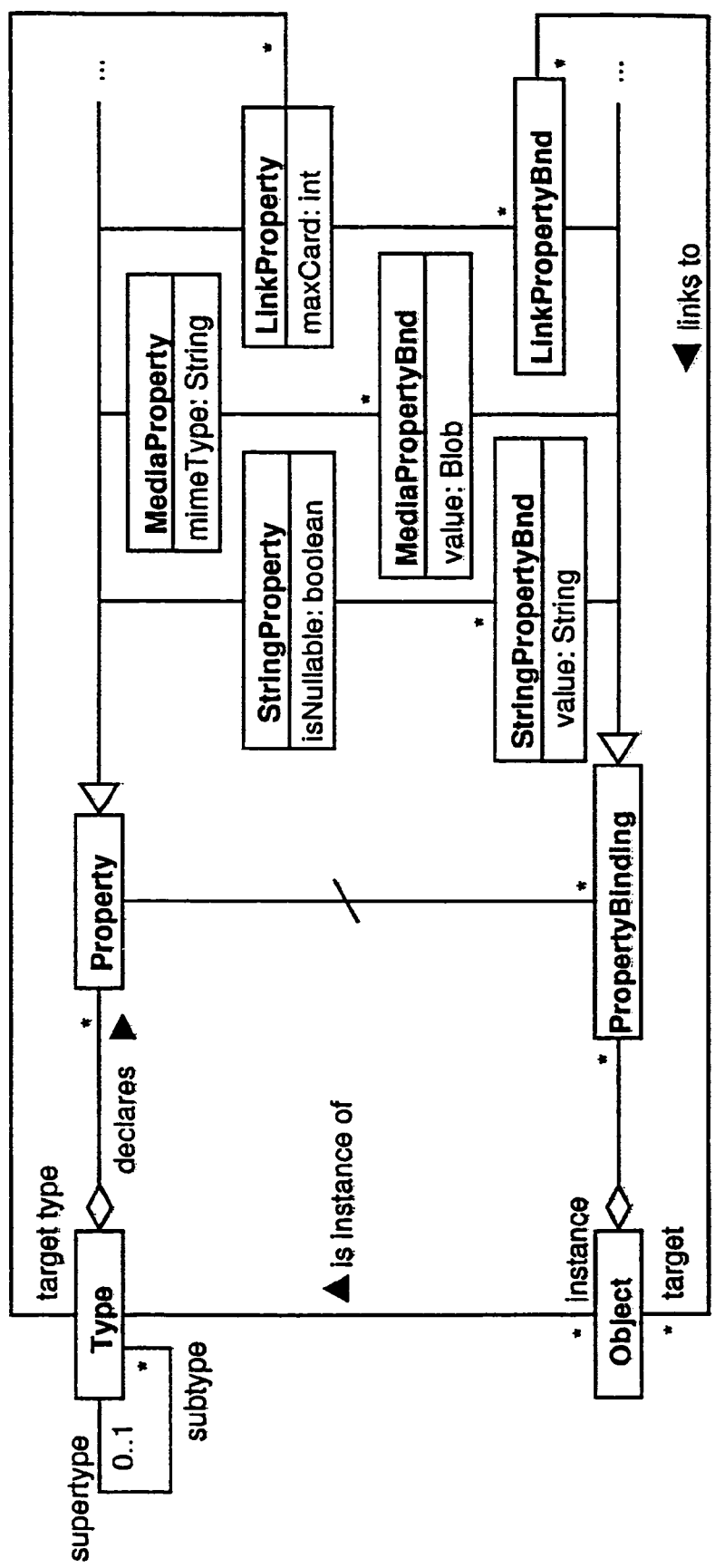
FIG. 2 shows a simplified UML class diagram for a meta model.

FIG. 2 shows a simplified UML class diagram for a meta-model. An object aggregates property bindings, each binding a property to an appropriate value. An object can bind a property only once. Available classes of properties include atomic properties such as string and integer properties, media properties bound to XML or binary data, and link properties bound to collections of links to other objects. Each object has a declared type. A type declares properties and can inherit further properties from a single parent type. The subtype/supertype relationship is acyclic. The predefined type "Resource" is the single root of the inheritance hierarchy. A declaration of a link property includes the expected type for targets of the link or link collection and other application level constraints such as cardinality restrictions.

The schema is an aggregation of several meta objects, namely types and property declarations, interconnected by inheritance and association. A number of constraints may relate the schema to the instances. Some natural language examples of constraints are:

an object only binds properties declared in its declared type or a supertype thereof;
if a property p is declared as nonnullable, then it must be bound in all instances of p's declared type, and all instances of transitive subtypes thereof;
for all targets t in a binding of a link property p, the declared type of t is a transitive subtype of or equal to the target type of p;
the number of targets in a binding of a link property p is not less than p's minimum cardinality and is not larger than p's maximum cardinality.

FIG. 3 shows a schematic diagram of an example to explain the handling of content data according to the present invention. In FIG. 3A a content schema 10, consisting for simplicity of a single object type Article 1, is presented. In this first version of the object-type definition article three properties 2, 3, 4 are defined. The property ID 2 is an atomic property of the integer type. The properties Text 3 and Author 4 are atomic properties of the string type. In addition, two content objects 5, 6 are presented. In the content management system according to the present invention, content data is stored in content objects. The content objects are used by a page generator to generate a web page using templates.

The objects 5, 6 are generated to store article data. In content object 5, property values for the properties ID 2, Text 3 and Author 4 are stored by binding these properties to the respective values "1", "This is text" and "Joe Average". In content object 6, the properties Text 3, Author 4 and Date are bound to their respective values. Since during the generation of content object 6, no identification number for this article was available, no value is bound to the property ID 2 of this object 6. An additional property Date was bound for object 6 to store the date when the object was generated. Since the generation and storing of content objects is independent of the content schema 10, the proposed method to store and access content data is very flexible. Content objects may be generated based on the available information to store in the object.

FIG. 4A shows a simple example of a template to illustrate the generation of web pages based on content objects. In this example the Text properties and the Author properties of three articles selected by the system are displayed. In FIG. 4B the displayed output of the web page is shown. The fields of the template are substituted by the content data, more precisely by the value of the respective properties of the content objects. Since in this example in the beginning only two content objects 5, 6 are available, empty fields are displayed at the bottom of the article list.

In FIG. 3B a modified content type definition 8 for the Article type is presented. In this second version of the content type Article 8 the property Author 4 was dropped and has been replaced by an integer property AuthorNo 16 in order to store an author number as opposed to an author name, in order to obtain unambiguous data. In addition, a new property Headline 9 was added. This property is a string property which is nullable. Nullable properties must not be present in an object to match the object type.

During operation of the content management system, a new content object 7 was generated and stored the next day. In this content object 7 an ID property, a Text property, an AuthorNo property, a Headline property and a Date property are stored.

According to the present invention stored objects are accessed by accessed by means a content schema. In FIG. 4C the displayed output of the web page generated by the template shown in FIG. 4A is presented. Because the template has not yet been adapted to the new content schema, it still accesses the old Author 4 property, which is undefined for the third article. The Text property of all three content objects is correctly displayed. The Headline property 9 of the modified Article type 8 is not used in the template shown in FIG. 4A. Additional information stored in properties of content objects not required in the content schema is ignored when accessing the content data by means of the content schema. Although the stored content objects 5, 6 do not completely match the modified content schema 11, the content management system may still access the available data in the content objects without converting the entire database to a format complying to the modified content schema.

FIG. 5A shows the web page template after being adapted to the object type declarations of the modified content schema 11. This template makes use of the properties of the second version of the Article object type 8 by using the AuthorNo property 16 and the Text property 3 of the content objects. Because an author number is not easily readable on a web page, a conversion function toName takes care of outputting the author's name.

FIG. 5B shows a web site generated by the template of FIG. 5A. During the access on the content objects 5, 6 the absence of the AuthorNo 16 property is detected, and an automated substitution procedure is invoked. The automated substitution procedure replaces missing property by a default. Afterwards, the conversion function to Name can convert the default value into the output "Unknown". While the output is still not perfect, it is now possible to adapt the stored data to the new schema.

In order to obtain and maintain consistency between object-type definitions stored in the content schema and the content objects, the integrity of the stored content objects may be examined by verifying if the stored content objects match type definitions and constraints of the content schema. Upon a detection of an integrity issue a predetermined issue resolution procedure is invoked to resolve the mismatch by adapting the content data accordingly. Alternatively, data mismatching the content schema may be presented to a user who is prompted to adapt the data. A user interface may assist the user by presenting schema and content and listing integrity issues to be resolved by the user. Schema violations may be reported and the user prompted to correct the content data or to fix the violation of metalevel integrity constraints if the schema itself is inconsistent. This may happen, e.g., when the inheritance hierarchy of the object-oriented schema is changed.

In the example shown in FIGS. 3, 4 and 5 the content objects 5, 6 and 10 are examined by comparing the types and properties to the object-type definitions of the modified content schema 7. Because the AuthorNo property 16 was not marked as nullable, the objects 5 and 6 will be reported as having issues, namely a missing property. After an automated correction that takes the property Author 4 into account or after a manual editing of the missing AuthorNo property 16. The web site si now correctly displayed as shown in FIG. 5C.

Other typical constraints imposed by a schema are range constraints for property values, cardinality constraints for the number of elements of a link collection property, or target type constraints restricting the type for a target object of a link property or a link collection property. Further constraints may relate to index properties. If a link collection is indexed using a given key property, then one such constraint may be that this key property must be stored in all elements of the link collection. Another constraint declares that, if a link collection is indexed using a given key property, then no two elements of the link collection may have the same key value. Furthermore, if the declaration of a link collection property (reverse link set, link list or link map) disallows duplicates, then the property must have no duplicate elements. Another constraint declares that if the declaration of a link collection property defines an inverse link collection property, then whenever A links to B using the forward property, B must link to A using the inverse property. Another possible constraint imposed by a schema is acyclicity: If a property is declared to be acyclic, then there must not exist a resource loop when following the given property. Every possible constraint gives rise to an issue. Issues may be efficiently checked incrementally, i.e., by only rechecking the resources that may be affected by a change of the content schema.

Based on the requirements for quality control and multiuser access configuration management for the content schema and the content objects is required. By means of configuration management the reproducible construction of versions of resources and its control evolution into new versions is enabled. Controlled evolution requires change management, status accounting, a review process, some form of workflow support and some form of teamwork support. Reproducibility is achieved by immutably recording all data and procedures used during development of the web site (either by name or by value) and by assigning a stable name to the set. All relevant resources are digitally represented and manipulated using computer implemented tools which allows the recording as well as the construction process to be automated. In the content management system according to the invention, the content schema and the content objects are stored in workspaces. A workspace is the place where a user or a group of users work together on advancing the web site in some direction. Changes can be applied to all resources in the content management system, but remain local to the workspace until explicitly transferred to another workspace. This allows to review changes in context, which is necessary since different resources can influence each other in subtle ways. Conversely, it allows to temporarily ignore changes applied in other workspaces. Since development happens in parallel, there is a potential for incompatible changes. These conflicts have to be resolved, sometimes involving user interaction, but also involving tool support for visualising the changes and proposing mergers. Workspaces are also known as long-term transactions.

Workspaces may be based on labels. A label refers to a set of resources, and selects exactly one version of each resource from the set. It can be considered a version of the aggregate of the referenced resources, and provides a single name for referring to the entire configuration. A label can be used to record a set of versions that "go together", i.e., fulfil some interresource integrity constraints or to record the versions of resources delivered to some customer, or to record the state of the entire web site at some significant point of time.

The content of a web site is malleable and is released very frequently. In content management, configuration management has to deal with explicit links between resources. Links are relevant, since a link between two resources manifests some kind of dependency or influence, and therefore gives hints about the possible implications of a change. After changes to the participating resources, the validity of a link may have to be rechecked. Storing links to fixed versions can lead to a proliferation of versions in the referring or aggregating objects, because for every new version of the link target, the link source will have to be updated as well. As a more feasible solution, links to objects are stored irrespective of versions, and on access, the version of the target object to use is resolved depending on the context. This context may be given by the notion of the workspace.

Another important notion of WCMS is staging, where content is duplicated into a private area and a publicly viewable area. The private copy of the web site becomes a production workspace, and a live copy is another workspace that is only accessed by merging updates from the production workspace. As soon as developments begin to interfere, the creation of additional workspaces becomes worthwhile. If the site layout is represented as content (content objects and object-type definitions are treated uniformly as resources), it is important to prevent broken intermediate layout versions to appear on the web site, or to prevent the broken layout to block the authoring of content.

Figure 6:
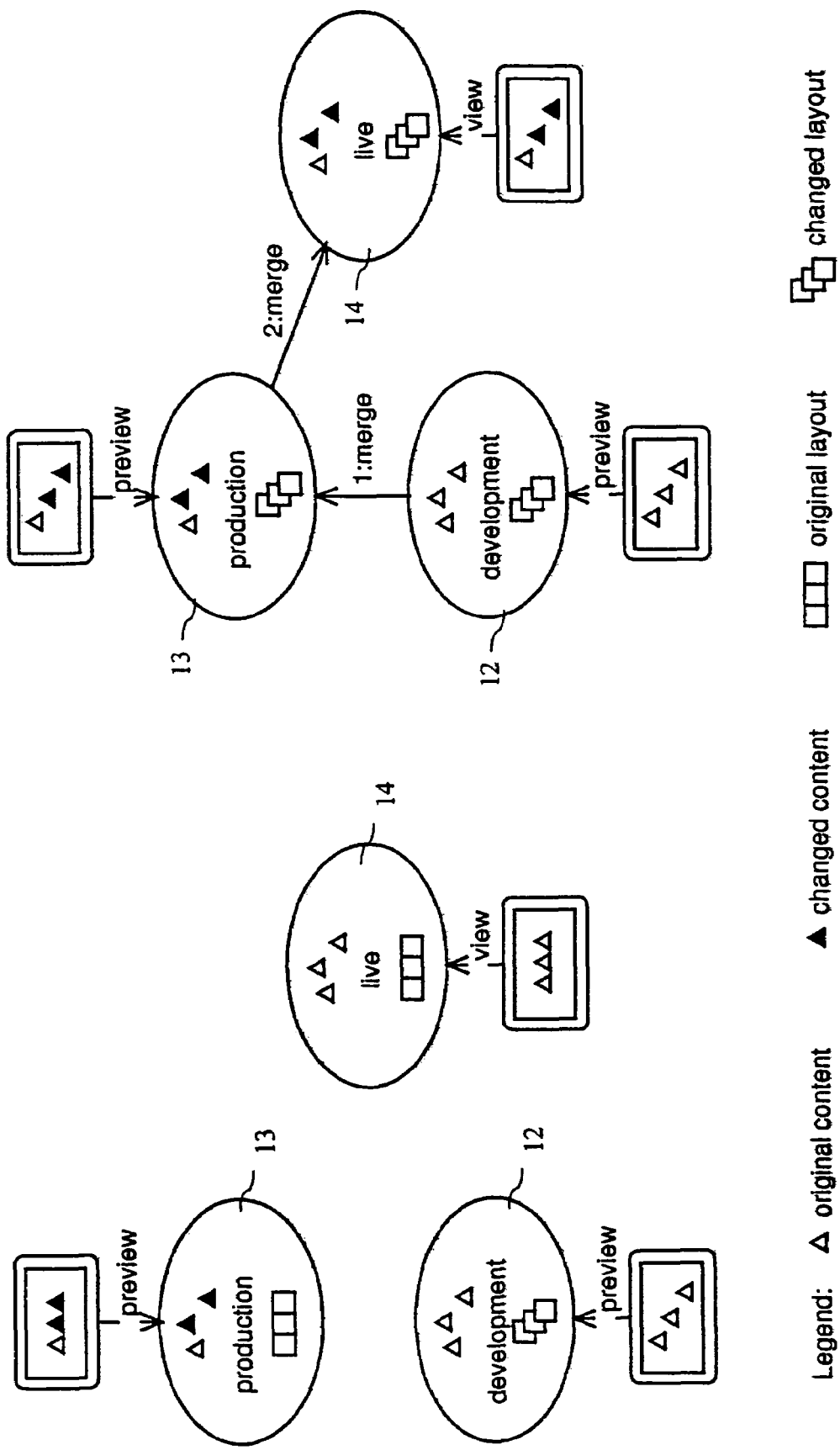
FIG. 6 shows an example to explain the concurrent evolution of content and layout.

As shown in FIG. 6, this conflict is resolved by introducing a layout development workspace 12, with only stable layout states being merged into the content production workspace 13, and from there to the live site 14. In the example of FIG. 6, the layout of the web site is modified in the development workspace 12, while the content is changed in the production workspace 13, and user accesses are handled in the live workspace 14. On the right hand side of FIG. 6, it is presented how these independent changes are integrated. First, the modified layout is merged from the development workspace 12 to the production workspace 13. In the production workspace 13 the modified layout and the changed content are integrated. After integration, the changes are merged from the production workspace 13 to the live workspace 14 where they will appear to the general public.

Additional refinements may include the introduction of an additional quality assurance staging level, and the introduction of an additional level of layout or editorial workspaces which are responsible for specific independent areas of the web site. Developing the content schema and operating with content in workspaces results in increasing parallelism and can protect from unwanted interference.

Based on the concept of workspaces an application service provider scenario can be implemented: Several customers use a common set of documents types, templates and structural objects, but develop their own site content and layout in isolation. The common framework is initially copied from a base workspace to a client workspace. However, the customer will want to stay up-to-date regarding further development of the framework. This can be achieved by developing the framework in separate workspaces until a stable state is reached, and then reintegrating the updates into the common base workspace. From there, a customer can on demand merge the update into his workspace. Since customers refer to a common framework, they may even exchange content directly from customer to customer. In the example shown in FIG. 7, two content applications are developed. After merging the content base into content application 1, content is added in this content application. A subset of the content base is merged into content application 2, where some of the content is edited (black triangle). After editing the content is merged back from content application 2 to the content base. From there, modified content is merged to content application 1. After these merges, the content data in content application 1 comprises all modifications of content.

Schema evolution during web site development and operation requires the recording of multiple versions of the schema and/or the recording of changes to the schema. The schema is an aggregation of several meta objects, namely types and property declarations interconnected by inheritance and association. Versioning only the complete schema cannot be maintained when independent modifications to the schema are to be merged e.g. when two new types are independently added to the schema. Merging schema versions must recognise the modifications as affecting disjoined meta objects, and therefore potentially being compatible.

It is therefore preferable to store versions of each meta object separately and to consider a schema version to be a label, i.e., an aggregation of individual versions of resources. Associations between meta objects are treated just like links between content objects, in the sense that the version of the target object to use is determined by the workspace, not by the link. This, however, can lead to the violation of meta level integrity constraints when seemingly independent changes are applied. E.g., when combining changes to the inheritance hierarchy, a merger may easily produce cycles. In order to allow manual resolution of integrity violations of this type, it is necessary to cope with objects not matching the schema, which is one of the advantages of the present invention.

It is preferable that links to explicitly given versions are not supported. Instead, only links to objects disregarding the versions are permitted. The same holds for schema data: links within the schema target schema objects, not versions. The singular link from content objects to schema objects, which denotes an object's type, also refers to the object type, not to a specific version of the type. This ensures a consistent handling of schema objects. In other words, the schema (the set of object type definitions) is treated in the same way as content objects. For the purpose of versioning, the schema is content.

Based on the concept of workspaces an application service provider scenario can be implemented: Several customers use a common set of documents types, templates and structural objects, but develop their own site content and layout in isolation. The common framework is initially copied from a base workspace to a client workspace. However, the customer will want to stay up-to-date regarding further development of the framework. This can be achieved by developing the framework in separate workspaces until a stable state is reached, and then reintegrating the updates into the common base workspace. From there, a customer can on demand merge the update into his workspace. Since customers refer to a common framework, they may even exchange content directly from customer to customer. In the example shown in FIG. 7, two content applications are developed. After merging the content base into content application 1, content is added in this content application. A subset of the content base is merged into content application 2, where some of the content is edited (black triangle). After editing the content is merged back from content application 2 to the content base. From there, modified content is merged to content application 1. After these merges, the content data in content application 1 comprises all modifications of content.

Schema evolution during web site development and operation requires the recording of multiple versions of the schema and/or the recording of changes to the schema. The schema is an aggregation of several meta objects, namely types and property declarations interconnected by inheritance and association. Versioning only the complete schema cannot be maintained when independent modifications to the schema are to be merged e.g. when two new types are independently added to the schema. Merging schema versions must recognise the modifications as affecting disjoined meta objects, and therefore potentially being compatible.

It is therefore preferable to store versions of each meta object separately and to consider a schema version to be a label, i.e., an aggregation of individual versions of resources. Associations between meta objects are treated just like links between content objects, in the sense that the version of the target object to use is determined instances. The set of property values bound by an object has to be stored individually for each object. The store only depends on the constant property type of property declarations, which determines the format of the values bound by that property.

Independence of the mutable schema results in increased flexibility when storing objects and properties. As mentioned before, the user defined schema is stored as objects, instances of predefined, immutable meta-types. For the purpose of storing, the schema is treated as content, meaning that object-type definitions and content objects are handled in the same way and are referred to as resources. The schema is subject to check-in/check-out access control and versioning just like regular content objects. All changes are recorded, at the latest when merging them between workspaces. Recorded states of individual objects and aggregates can be retrieved and compared later on the application level.

If possible, the store allows the interpretation of previously stored data according to an evolved schema, e.g., by delivering default values for absent properties. In this way, the creation of additional versions is avoided, which simplifies or avoids merging. This is necessary especially when a schema update is merged into a busy production workspace. In this case, editorial work should be disturbed as little as possible.

An example of a complex schema evolution which requires no changes to the instances (the content objects) appears in refactoring, when a type T is split in two types in such a way that a type T' is inserted which becomes the new supertype of T and receives the old supertype of T as its own supertype. Since the total set of inherited properties of T has not changed, its instances are not affected even if the properties previously declared in T are now distributed across T and T'.

The part of the system level closest to the application level is the integrity issue detection. In order to detect integrity issues, the system interprets the rules expressed in the user-defined schema (if possible), applies them to the content base and reports any violations. Checks may be performed incrementally for efficiency reasons.

Since all intraschema integrity constraints can be expressed using an immutable meta schema, integrity issues in the user-defined schema are reported like any other integrity issue. In order to avoid reporting after effects, integrity issues in instances of a type may be suppressed, if the type itself has issues.

It is possible to preclude integrity issues in certain workspaces, most importantly in live workspaces 14 which are used to generate the web pages of the public web server. FIG. 8 shows an example for a situation where malformed content arises due to a changed content type (black circle) that was merged into the production workspace 13. The problem is reported to an operator who must resolve the issue by adapting a content object (black triangle) before merging the schema and the content into the live workspace 14, thereby keeping the live workspace 14 permanently operational.

The application layer of the content management system is responsible for reacting to schema problems by analysing the change history and evaluating problems in context; determining a course of actions to resolve issues, either by calling an issue resolution procedure, or by proposing different solutions to the operator; and implementing the resolution of schema issues by migrating content or merging in compatible schema changes.

Automated support for analysing schema changes is feasible, even for changes involving multiple types and their relation to each other. Sometimes it is preferable that a human operator has to verify the proposed transformer before it is applied to the contents.

Figure 9:
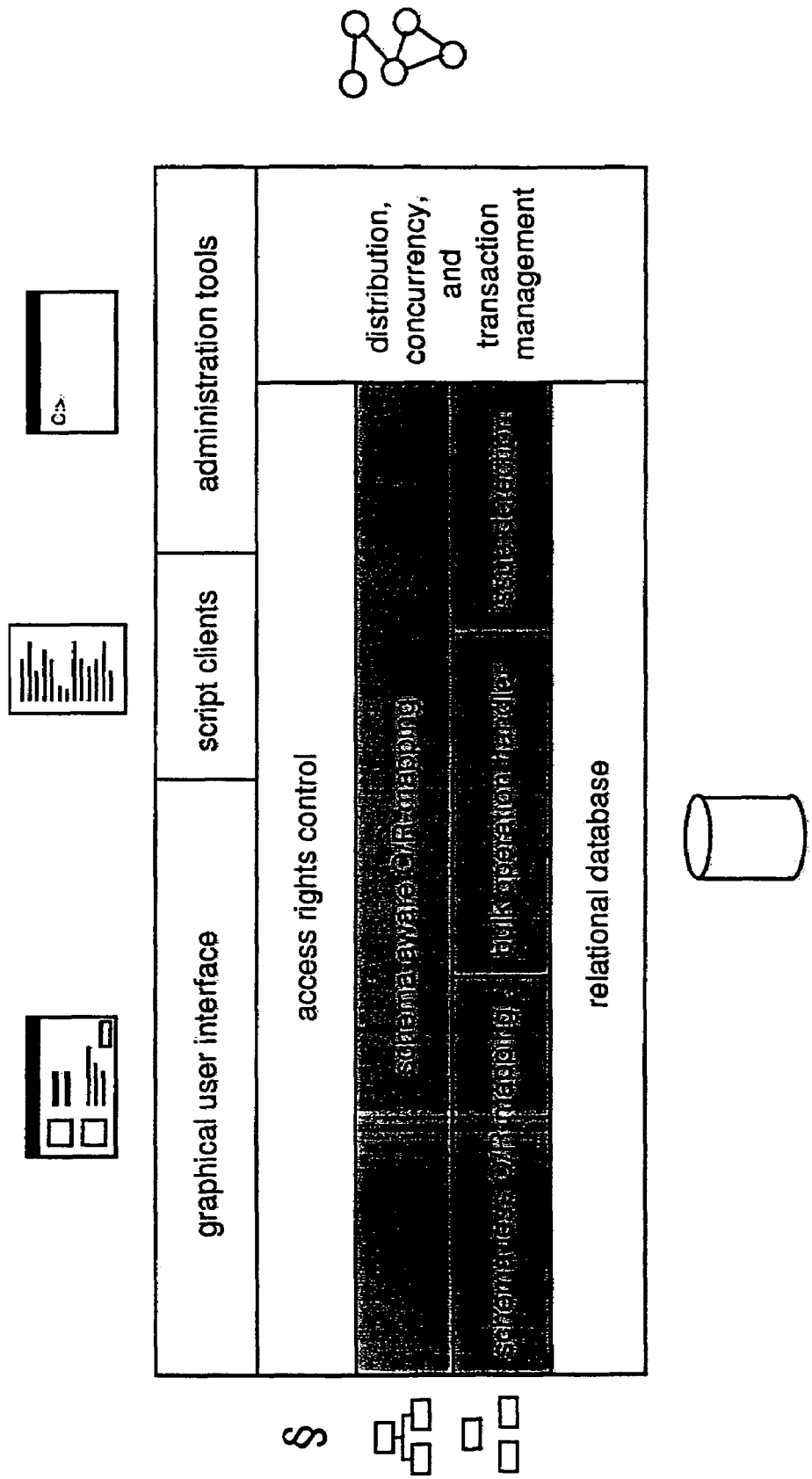
FIG. 9 shows a preferred system architecture for implementing the invention.

FIG. 9 shows a preferred system architecture for implementing a data processing apparatus according to the invention. In this apparatus, content objects to store content data are generated by a content object generation means 20. The generated content objects are stored in a content object storing means 21 which is structured in this preferred embodiment as a relational database. The relational database is used by an object/relational mapping that does not yet incorporate information about the schema. This mapping is only concerned with nonnull stored properties, although it provides basic computation methods for reverse navigation, computation of indices and the like. An object-oriented content schema is generated by a content schema generation means 22 and stored in a content schema storing means 23.

Two other components, the bulk operation handler and the issue detection, execute directly on the relational database in order to gain a performance advantage. On top of these components a content object accessing means 24 structured as an object-oriented presentation layer is created. The object-oriented presentation layer is aware of the schema and presents computed properties and null-valued properties correctly. The presentation layer performs a schema-aware object/relational mapping.

Figure 10:
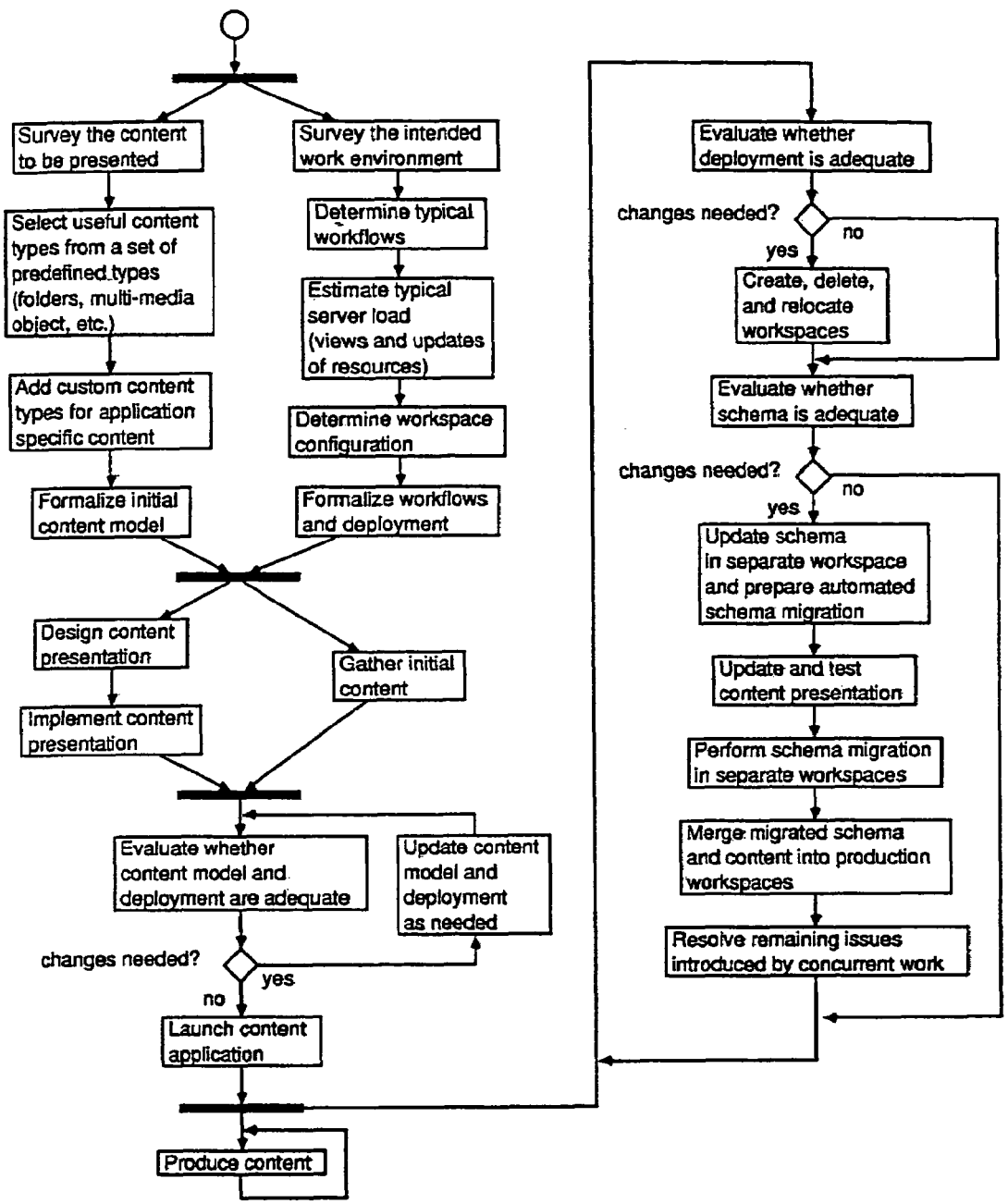
FIG. 10 shows a flow diagram to explain an evolutive web site development process.

FIG. 10 gives an overview of an example of the lifecycle of a content application that employs schema migration and configuration management to respond to changing requirements and inevitable shortcomings of the initially conceived setup. The presented lifecycle assumes that there are essentially two phases when setting up a content application: the initial creation and the subsequent maintenance of the operation. Providing the possibility of schema evolution according to the invention simplifies maintenance, but it also takes some burden of the setup phase, because suboptimal solutions can be improved later on.

The most important versioning operations in integrating different versions of different workspaces are unifying and merging. Unification ensures that all versions present in one workspace are also accessible in the other workspace. Merging ensures that the information contained in conflicting unified versions is combined into a new merged version of the resource.

Unification can always be done fully automatically without any user intervention. Sometimes merging might require further actions of the user whenever version conflicts, i.e., inconsistent changes of the same resource in different workspaces, are detected. An automatic merge procedure may be dynamically configurable (to be exchanged during run time of the system). In a property type specific merge procedure, a merged property value may be calculated (partially or completely). If the value can only be merged partially, a conflict is reported, where the report includes both changed property values and the proposed partial merge. If the property merge can be completed automatically, a warning about a heuristic merge may be reported. Another preferred solution to resolve merge conflicts is to query the content schema and to give preference to the value that satisfies the schema and avoids issues. On the other hand, it might be sensible not to resolve conflicts in the schema automatically at all, so that the user is requested to resolve the conflict even in those cases that lend themselves to an algorithm based solution. For example, quality or security requirements might lead to such a decision. After an automatic merge of versions, issue detection may be performed, and detected issues may be included in a generated report.

Merging and unification of resource versions may be applied to object type definitions as part of the schema as well as to content objects, since both are treated in the same way as general resources of the content management system.

Figure 11:
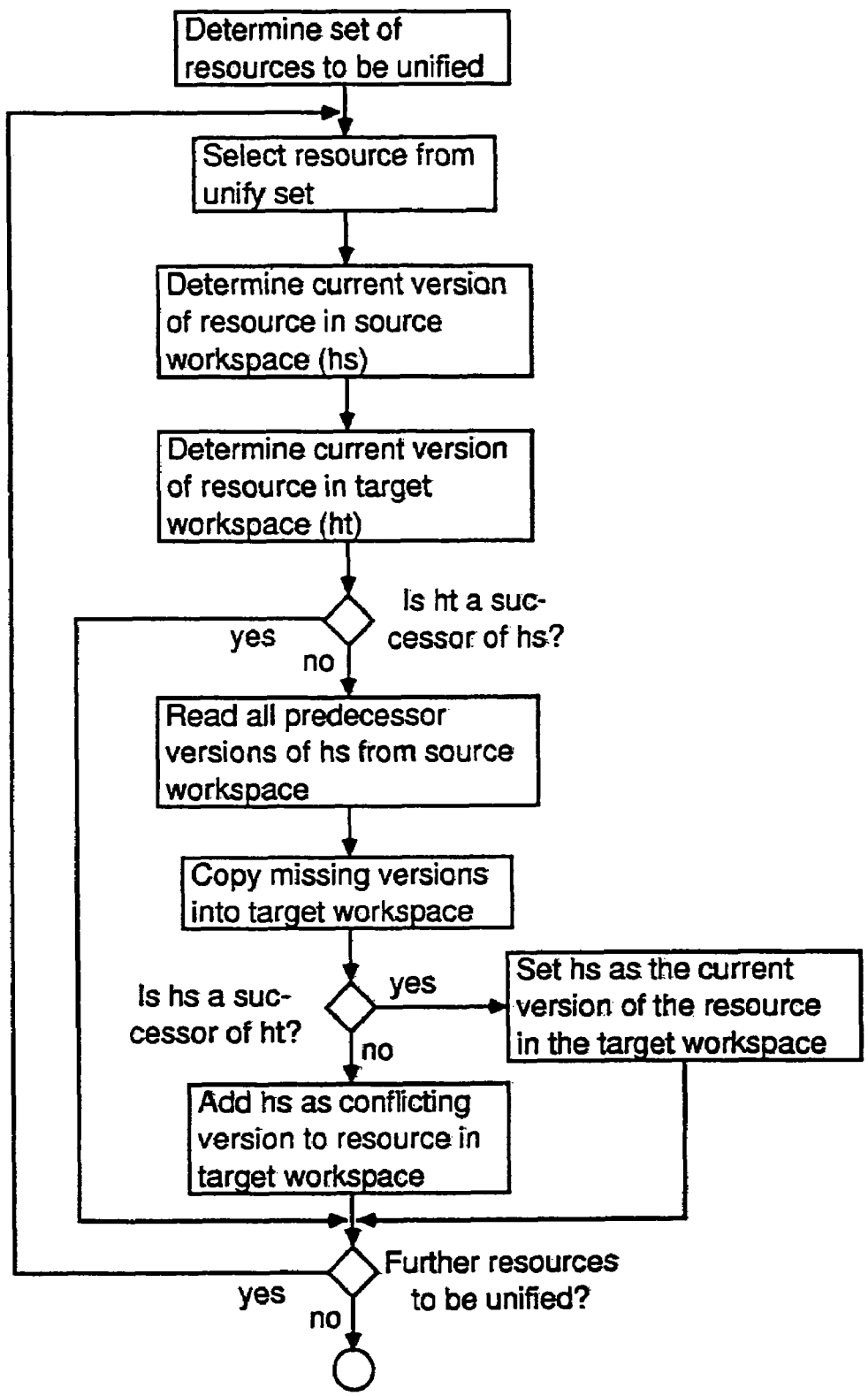
FIG. 11 shows a flow diagram to explain the unification of a set of versions across workspaces.

FIG. 11 shows a flow diagram to explain the unification of a set of versions across workspaces.

Figure 12:
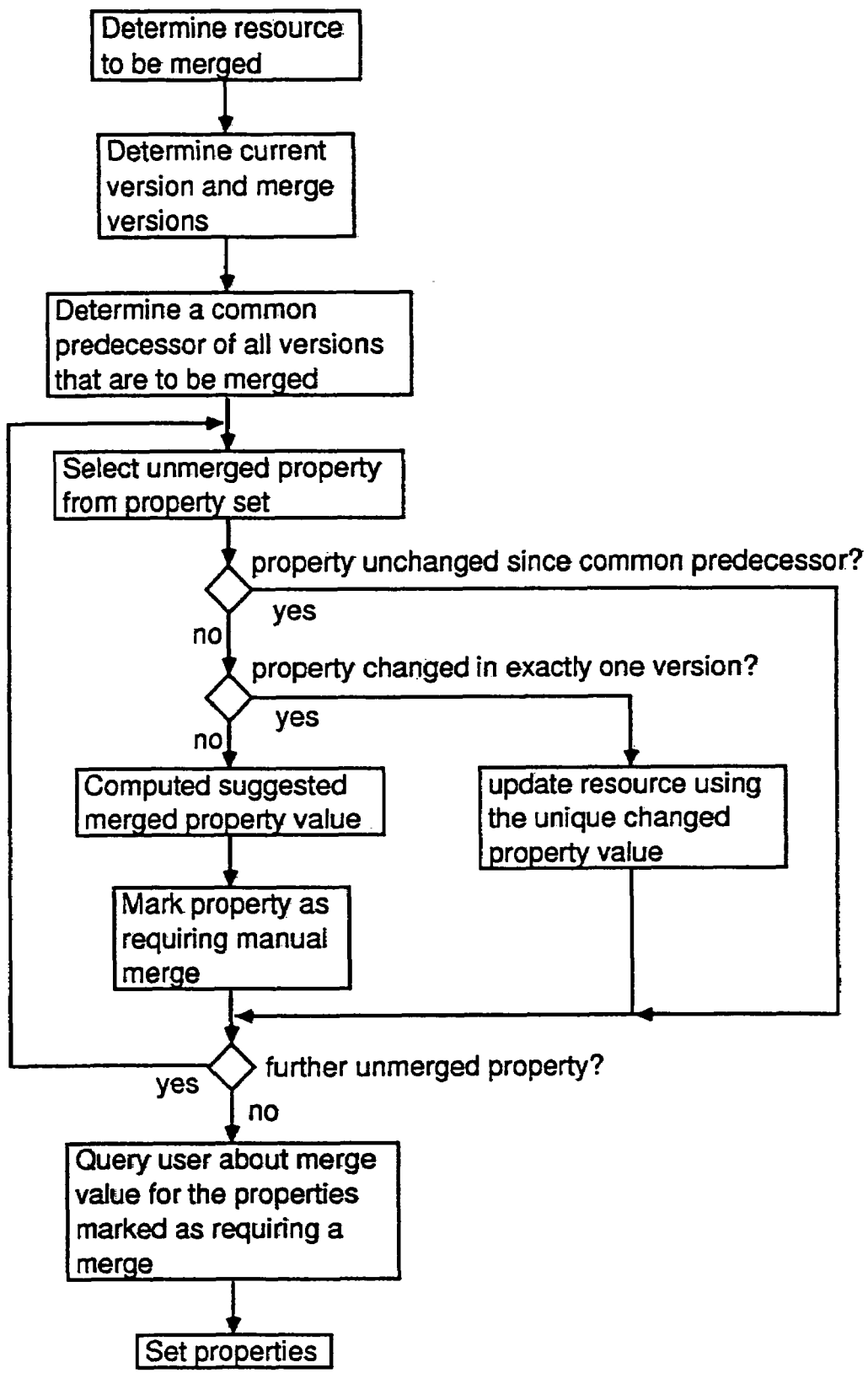
FIG. 12 shows a flow diagram to explain the resolution of conflicts.

FIG. 12 shows a flow diagram explaining the resolution of conflicts between different versions of a resource (merging). Unification and merging must not necessarily be performed in immediate succession. In fact, multiple unifications are possible before resolving a merge conflict.

Issues are violations of either system defined constraints or mismatches of the type system and the stored resource state. Issue detection is completely separate from merge conflict detection. In fact, a merge without conflicts might result into issues. Similarly, no issues might turn up while many merge conflicts are resolved.

Which issues are defined and detected depends on the actual type system used. E.g., an implementation that supports multiple inheritance might, or might not, report an issue if one supertype is inherited twice via different paths. An implementation that does not use inheritance at all might still report types without name. Any implementation that allows to specify target types for link properties might complain about illegal values, whereas simpler systems might only complain if a link property is not marked as nullable or nonnullable.

Figure 13:
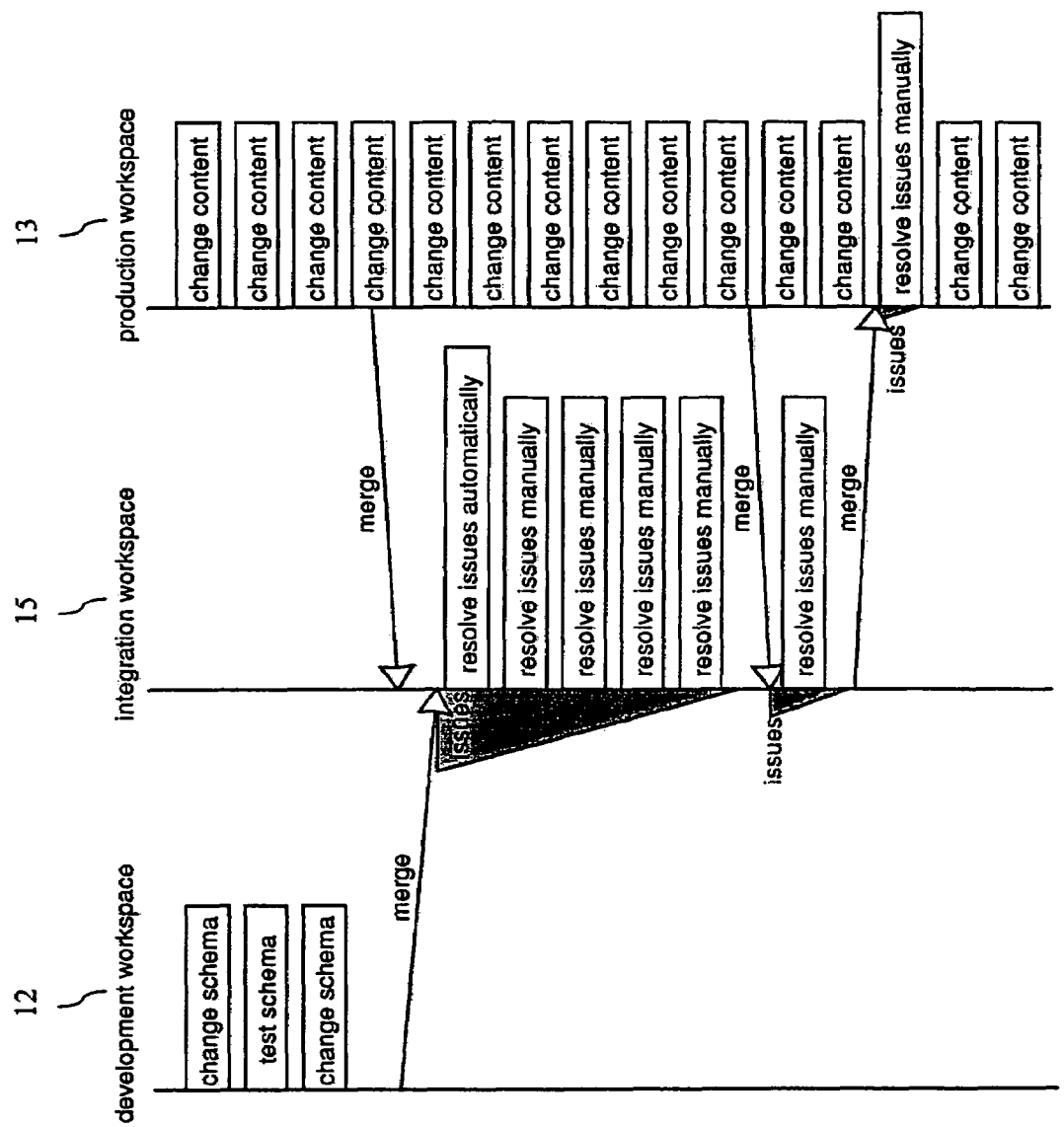
FIG. 13 illustrates how multiple merges across workspaces and issue detection may minimise impact on production work.

FIG. 13 illustrates how multiple mergers across workspaces and issue detection can lead to a clean production workspace 13 with minimum interruption of the normal work procedure. First, the schema is modified and tested in a separate development workspace 12, so that preliminary experimental schema versions are not visible outside. Secondly, the content data and the new schema are merged into a dedicated integration workspace 15. Issues are immediately reported. Thirdly, issues can be resolved by automated procedures that were developed beforehand in the development workspace 12. This stage might not be able to resolve all issues in all cases. Therefore a manual correction of issues follows as a fourth stage. While the issues were resolved in the integration workspace 15, a few resources win have been modified in the production workspace 13. These changes can now be merged into the integration workspace 15. Since only a few resources were modified, only a few issues need to be resolved, and only few further changes are introduced into the production workspace 13. When the integration workspace 15 is finally merged into the production workspace 13, only very few issues will remain, which can be resolved in the production workspace 13 without fatal effects on the remaining work.

Figure 14:
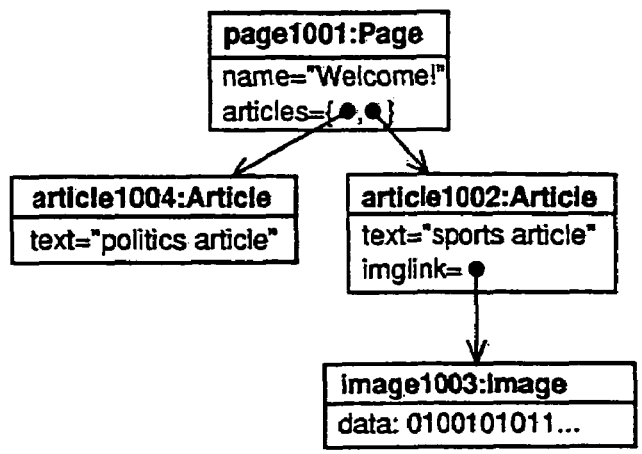
FIG. 14 shows an example to explain a possible mapping of a content base to relational database.

FIG. 14 shows an example of a content base. A single page object, which represents the home page of the managed site, contains two articles, one sports article and one politics article. The sports article is enriched by an image. Note that this example is considerably simplified in order to clarify the following presentation. In real applications, articles might also contain a separate headline, a summary, the name of the writer, links to other articles, an expiration date, and so on.

In the following it will be shown how this content base can be stored in a relational database. In FIG. 14, properties were represented by their names, which is inappropriate for permanent storage for several reasons: it consumes a lot of storage space, it makes it impossible to change the names of the properties later on, which may very well be desirable, and it makes it more difficult to introduce different properties with the same name for different object types. Therefore, the properties are internally represented by identifiers, e.g., numbers. FIG. 14B shows an arbitrarily chosen mapping.

Similarly, IDs are chosen for the objects. In FIG. 14A such identifiers j are already provided in the form of numbers for each object. E.g., the page object has the ID 100 1.

One possible representation of the content data can be obtained by creating one database table per property type, i.e., one table for string properties, one table for link properties, and so on. FIG. 14C shows the string property table.

The other table that will be shown is the link collection property that associates article to pages. FIG. 14D shows that the database may contain more than one row for each object/property pair, because a link collection might contain more than one element. Still, it holds that each object binds each property to at most one value, in this case to one set value.

When a content object is accessed, the property-value bindings of the content object can be retrieved by selecting from the property tables all rows with the object ID associated to the content object. The precise representation of the object can afterwards be determined by taking the schema into account.

The selected table structure makes the storage entirely independent of the schema defining the content types. Whether the Article type actually defines the property imglink or not is irrelevant. If an article contains a binding of the img link property, this property is stored, otherwise it isn't.

In FIG. 14D the association of property IDs to property names was treated as a special case, but it is of course possible to consider the properties themselves as specialised objects. This would lead to a uniform space of IDs and would allow to treat the name of the property simply as a special string property that is only provided for objects that represent properties. Similarly, content object types can be represented as objects. It is convenient to define resources as the union of content objects and schema objects.

While the IDs were shown as simple integers, more complex ID structures are possible, which might make it easier to keep IDs unique.

Figure 15:
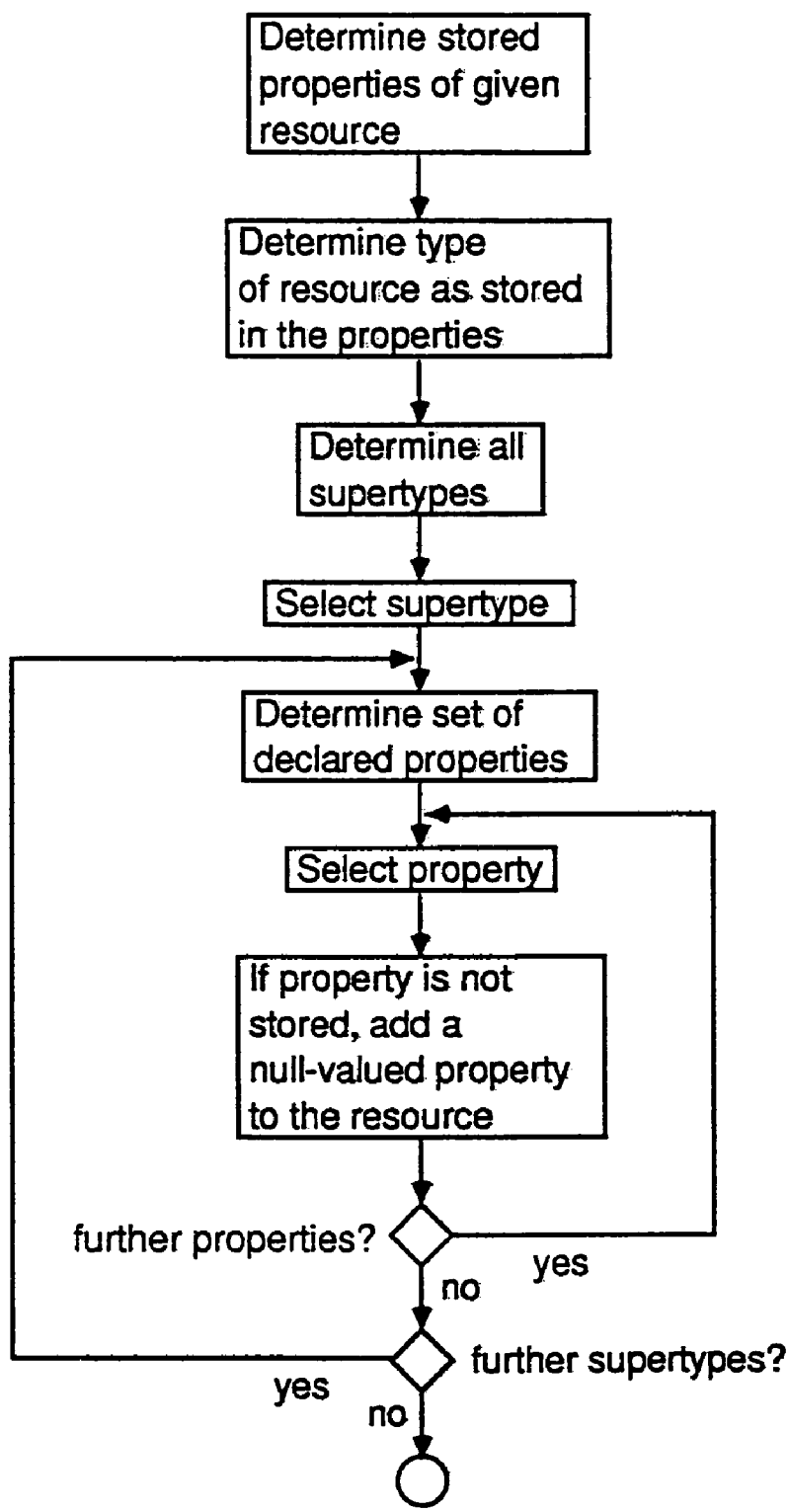
FIG. 15 shows a flow diagram to explain how the set of properties for a resource is determined.

As mentioned before, null data values are not stored in order to ease the removal of unnecessary properties from the store and to save storage size. However, when the properties of a resource are accessed, the null properties will be readded whenever they are mentioned by the schema. FIG. 15 shows a flow diagram explaining how the set of all properties for a resource is determined.

The invention claimed is:

1. A method for storing and accessing data in a content management system, comprising:
   storing content data in content objects that include a plurality of property value bindings, the content objects being capable of binding properties to values, each property including a respective property type and the values being stored according to the property type corresponding to the respective property;
   generating and storing an object oriented content schema for modelling the content data by defining content object types, the content object types declaring required object properties wherein the content schema imposed constraint on the content objects, and the integrity of the content objects is examined by verifying constraints imposed on the content objects;
   accessing at least one of the content objects via the content schema; and
   recording one of resource version for modifications of the content objects and objects type definitions, wherein for the purpose of versioning, the content object and object type definitions are treated uniformly as resources.

2. The method according to claim 1, further comprising:
   examining an integrity of the content objects by verifying if the content objects match the content schema.

3. The method according to claim 2, further comprising:
   upon a detection of an integrity issue, performing at least one of the following: causing a predetermined issue resolution procedure to resolve a mismatch by adapting the content data,
   generating a mismatch report, and
   presenting data that mismatches the content schema to a user and prompting the user to adapt the data that mismatches the content schema.

4. The method according to claim 3, further comprising:
   examining the integrity of the content objects by comparing the types and the properties of the content objects to definitions of the content object types of the content schema.

5. The method according to claim 4, further comprising:
   upon the detection of the integrity issue, performing a predetermined issue resolution procedure to resolve a schema mismatch by adapting at least one of property values and property types of those of the content objects mismatching the content schema.

6. The method according to claim 1, wherein at least one of the following:
- each property is a link property linking one of the content objects having the link property to a target object,
- each property is a link collection property including one of a set and a bag of links to target objects.

7. The method according to claim 1, wherein:
the constraints imposed on the content objects relate to at least one of permitted properties of the content objects, required properties of the content objects, and attributes of properties corresponding to one of permissible ranges of property values and types of link property targets.

8. The method according to claim 1, wherein:
upon a violation of one of the constraints a predetermined issue resolution procedure resolves the violation by adapting the content data violating the one of the constraints.

9. The method according to claim 8, wherein:
the predetermined issue resolution procedure resolves the violation by one of adapting, adding, and removing property values.

10. The method according to claim 1, further comprising:
in response to a content schema modification, examining an integrity of the content objects only for those objects that may be affected by the content schema modification.

11. The method according to claim 10, wherein:
the integrity is examined for at least one of the following:
- objects of one of a modified object type and a subtype of the modified object type,
- objects including a modified property, and
- objects affected by modifications of constraints relating to attributes of the properties.

12. The method according to claim 1, wherein:
each property is a computed property, and
a value of the computed property is automatically calculated upon access on a content object whose type declares the computed property.

13. The method according to claim 12, wherein one of:
the value of the computed property is calculated based on a set of properties of the corresponding object, and
the value of the computed property is a collection of objects having link properties one of linking back to one of the content objects having the computed property and on a link collection property of that object and property values of the content objects referenced by the collection.

14. The method according to claim 1, further comprising:
storing at least one of:
- a label referring to a set of objects, each having a specified version, and
- a label referring to a content schema version comprising an aggregation of object type definitions, each having a specified version.

15. The method according to claim 14, further comprising:
storing versions of the content objects including one of link properties and link collection properties irrespective of versions of target objects.

16. The method according to claim 1, further comprising:
storing the content schema and the content objects in j workspaces, wherein:
modifications of the content schema and the content objects remain local to the respective workspace in which the modification occurred until explicitly transferred to another workspace.

17. The method according to claim 16, further comprising:
providing the following:
- a development workspace for the modification of the content schema, a production workspace for generation and modification of the content objects, and
- an integration workspace for an integration of a content schema modification, a content object generation, and a content object modification.

18. The method according to claim 16, wherein:
different versions of the same resource from a source and a target workspace are unified in the target workspace by selecting the latest version for the resource of one workspace, if the latest version of the other workspace is preceding the selected version, and
otherwise a version conflict is detected and the versions from both workspaces are marked as conflicting versions.

19. The method according to claim 18, wherein:
the conflicting versions for the same resource are merged into a single version, and
the merging is performed individually for every property used in any of the versions, taking into account the property values of a suitable determined common predecessor version of all conflicting versions and the property values of the conflicting versions.

20. The method according to claim 18, wherein:
a merge procedure for one of selecting one of the conflicting versions as merged version of the resource for selecting one of the property values of the conflicting versions as merged property value for the resource, and for calculating a property value based on the property values of the conflicting versions is invoked.

21. The method according to claim 1, further comprising:
one of accessing and presenting one of the content objects to a user by accessing each property of the one of the content objects according to at least one of a respective property declaration and an object type definition for the one of the content objects.

22. The method according to claim 1, wherein:
at least one of the content objects, the content object types, and the properties are identified by unique invariable identifiers.

23. The method according to claim 22, wherein:
at least one of the content objects and the content object types are represented in a persistent store that is updated transactionally in one of a relational database and an object database.

24. The method according to claim 1, wherein event notifications are distributed upon changes to the content objects or the schema.

25. A computer program product including program code that is stored on a computer readable medium and that when executed on a computer results in the performance of the following:
storing content data in content objects that include a plurality of property value bindings, the content objects being capable of binding properties to values, each property including a respective property type and the values being stored according to the property type corresponding to the respective property;
generating and storing an object oriented content schema for modelling the content data by defining content object types, the content object types declaring required object properties wherein the content schema imposes constraints on the content objects, and the integrity of the content objects is examined by verifying constraints imposed on the content objects;

accessing at least one of the content objects via the content schema; and recording one of resource version for modifications of the content objects and object type definitions, wherein for the purpose of versioning, the content objects and object type definitions are treated uniformly as resources.

26. A computer readable medium having a computer program, executable by a computer, comprising a program code arrangement having program code for performing the following:

storing content data in content objects that include a plurality of property value bindings, the content objects being capable of binding properties to values, each property including a respective property type and the values being stored according to the property type corresponding to the respective property;

generating and storing an object oriented content schema for modelling the content data by defining content object types, the content object types declaring required object properties wherein the content schema imposes constraints on the content objects, and the integrity of the content objects is examined by verifying constraints imposed on the content objects;

accessing at least one of the content objects via the content schema; and recording one of resource versions for modifications of the content objects and objects type definitions, wherein for the purpose of versioning, the content objects and object type definitions are treated uniformly as resources.

27. A data processing apparatus for storing and accessing data in a content management system, comprising:

a hardware processing device including:

a content object generation arrangement for generating content objects to store content data, each content object including a plurality of property value bindings, each property including a respective property type, and values corresponding to the respective property type;

a content object storing arrangement for storing generated content objects;

a content schema generation arrangement for generating an object oriented content schema to model content data by defining content object types, wherein each content object type declares required object properties and wherein the content schema imposes constraints on the content objects, and the integrity of the objects is examined by verifying constraints imposed on the content objects;

a content schema storing arrangement for storing generated content schema;

a content object accessing arrangement to access stored content objects via the stored content schema; and a resource version recording arrangement for recording one of resource versions for modification of the content objects and object type definitions, wherein for the purpose of versioning, the content objects and object type definitions are treated uniformly as resources.

28. The data processing apparatus according to claim 27, further comprising:

an integrity examination arrangement to examine an integrity of the stored content objects by verifying if the stored content objects match the stored content schema.

29. The data processing apparatus according to claim 28, further comprising:

an integrity issue resolution arrangement to resolve a detected schema mismatch by adapting the respective content data.

30. The data processing apparatus according to claim 27, further comprising:

a resource version recording arrangement to record resource versions for one of modified content objects and object type definitions, wherein the content objects and the object type definitions are handled uniformly as resources.

31. The data processing apparatus according to claim 27, further comprising:

a workspace arrangement to store individual versions of the content schema and the content objects in workspaces, wherein:

modifications of the content schema and the content objects remain local to the respective workspace in which the modification occurred until explicitly transferred to another workspace.

32. The data processing apparatus according to claim 31, further comprising:

a unification and merging arrangement to integrate different versions of the same resource from a source and a target workspace.

33. The data processing apparatus according to claim 27, further comprising:

a database arrangement to store at least one of the content objects and content type definitions persistently.

34. The data processing apparatus according to claim 27, further comprising at least one of:

an input arrangement to input content data to be stored in the content objects; and an output arrangement to j output the content data by accessing each property of at least one of the stored content objects according to at least one of a respective property declaration and an object type definition stored in the content schema storing arrangement.

* * * * *

UNITED STATES PATENT AND TRADEMARK OFFICE
CERTIFICATE OF CORRECTION

PATENT NO.      : 7,620,936 B2                                             Page 1 of 1
APPLICATION NO. : 11/233727
DATED           : November 17, 2009
INVENTOR(S)     : Ernst et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1006 days.

Signed and Sealed this

Twenty-sixth Day of October, 2010

David J. Kappos
*Director of the United States Patent and Trademark Office*